US00RE50769E

(19) United States
(12) Reissued Patent
Douglass et al.

(10) Patent Number: US RE50,769 E
(45) Date of Reissued Patent: Jan. 27, 2026

(54) LOCKOUT/TAGOUT SYSTEM AND METHOD INCLUDING MULTI-USER LOCKOUT DEVICE WITH ELECTRONIC LOCKING AND WIRELESS CONTROL INTERFACE

(71) Applicant: Eaton Intelligent Power Limited, Dublin (IE)

(72) Inventors: Robert Stephen Douglass, Wildwood, MO (US); Vinicius M. Petroni, Wildwood, MO (US); Matthew G. Mohr, Wildwood, MO (US); John P. Stampfel, Sewickley, PA (US)

(73) Assignee: Eaton Intelligent Power Limited, Dublin (IE)

(21) Appl. No.: 18/128,078

(22) Filed: Mar. 29, 2023

Related U.S. Patent Documents

Reissue of:
(64) Patent No.: 10,614,646
Issued: Apr. 7, 2020
Appl. No.: 16/261,902
Filed: Jan. 3, 2019

(51) Int. Cl.
*H01H 9/28* (2006.01)
*G07C 9/00* (2020.01)

(52) U.S. Cl.
CPC ..... *H01H 9/287* (2013.01); *G07C 9/00309* (2013.01); *G07C 9/00896* (2013.01); *H01H 9/281* (2013.01); *G07C 2009/00388* (2013.01); *G07C 2009/00777* (2013.01); *G07C 2009/00793* (2013.01); *G07C 2209/08* (2013.01); *G07C 2209/62* (2013.01)

(58) Field of Classification Search
CPC .... H01H 2/287; H01H 9/281; G07C 9/00309; G07C 9/00896; G07C 2009/00777; G07C 2009/00388; G07C 2009/00793; G07C 2209/08; G07C 2209/62
See application file for complete search history.

(56) References Cited

U.S. PATENT DOCUMENTS 5,979,754 A * 11/1999 Martin ..... G07C 9/27 235/382
8,068,323 B2 11/2011 Mughal et al.
8,207,858 B2 6/2012 Knopf et al.
(Continued)

FOREIGN PATENT DOCUMENTS

WO 2016004278 1/2016
WO WO 2016004278 A1 1/2016

OTHER PUBLICATIONS

EP OA received for EP Application No. 20704392.8, 8 pages, Sep. 1, 2023.
(Continued)

*Primary Examiner* — C. Michelle Tarae
(74) *Attorney, Agent, or Firm* — Baker Botts L.L.P.

(57) ABSTRACT

Lockout/tagout devices are configured to receive multi-user, electronically generated locking and unlocking commands over wireless interfaces to realize lockout safety chains of a desired length to assure worker safety in an industrial system. Electronically implemented systems and methods are also disclosed providing for enhanced worker safety, increased security, and improved lockout/tagout oversight involving a reduced number of locking devices and with fewer complications compared to conventional lockout/tagout devices, systems and processes.

21 Claims, 6 Drawing Sheets

(56) References Cited

U.S. PATENT DOCUMENTS

| | | | | |
|---|---|---|---|---|
| 8,222,993 | B2 * | 7/2012 | Bliding | G07C 9/00174 340/10.33 |
| 8,384,548 | B2 | 2/2013 | Knopf et al. | |
| 8,593,249 | B2 * | 11/2013 | Bliding | E05B 49/00 340/5.2 |
| 9,455,839 | B2 | 9/2016 | Conrad et al. | |
| 9,501,046 | B2 | 11/2016 | Kalous et al. | |
| 9,600,696 | B2 | 3/2017 | Ebner | |
| 9,600,949 | B2 | 3/2017 | Conrad et al. | |
| 9,728,022 | B2 | 8/2017 | Gengler et al. | |
| 9,747,739 | B2 | 8/2017 | Gengler et al. | |
| 9,916,466 | B2 | 3/2018 | Daino et al. | |
| 9,920,550 | B2 | 3/2018 | Ebner | |
| 9,965,910 | B2 | 5/2018 | Kalous et al. | |
| 9,971,344 | B2 | 5/2018 | Michalscheck et al. | |
| 9,996,999 | B2 | 6/2018 | Conrad et al. | |
| 10,096,183 | B2 * | 10/2018 | Nitu | G07C 9/00912 |
| 10,254,749 | B2 | 4/2019 | Main-Reade et al. | |
| 10,382,608 | B2 * | 8/2019 | Gerhardt | |
| 10,460,544 | B2 * | 10/2019 | Retzlaff | G07C 9/00309 |
| 11,094,152 | B2 | 8/2021 | Minsley et al. | |
| 11,098,500 | B2 | 8/2021 | Gengler et al. | |
| 11,232,513 | B2 | 1/2022 | Minsley et al. | |
| 11,233,641 | B2 | 1/2022 | Soundararajan et al. | |
| 11,250,466 | B2 | 2/2022 | Soundararajan et al. | |
| 11,270,403 | B2 | 3/2022 | Soundararajan et al. | |
| 11,271,908 | B2 | 3/2022 | Soundararajan et al. | |
| 11,356,443 | B2 | 6/2022 | Soundararajan et al. | |
| 11,403,674 | B2 | 8/2022 | Soundararajan et al. | |
| 11,416,919 | B2 | 8/2022 | Minsley et al. | |
| 11,488,160 | B2 | 11/2022 | Soundararajan et al. | |
| 11,488,161 | B2 | 11/2022 | Soundararajan et al. | |
| 11,538,098 | B2 | 12/2022 | Minsley et al. | |
| 2010/0147041 | A1 * | 6/2010 | Teicher | E05B 73/0005 70/58 |
| 2012/0280783 | A1 * | 11/2012 | Gerhardt | G07C 9/00309 340/5.6 |
| 2013/0214903 | A1 | 8/2013 | Kalous | |
| 2016/0284144 | A1 | 9/2016 | Michalscheck | |
| 2018/0321661 | A1 | 11/2018 | Main-Reade | |
| 2019/0228601 | A1 * | 7/2019 | Grzenda | G07C 9/00571 |
| 2020/0284066 | A1 | 9/2020 | Tong et al. | |
| 2021/0181719 | A1 | 6/2021 | Vasko | |

OTHER PUBLICATIONS

International Search Report and Written Opinion for International Application PCT/EP2020/025035, 18 Pages.

* cited by examiner

LOCKOUT/TAGOUT SYSTEM AND METHOD INCLUDING MULTI-USER LOCKOUT DEVICE WITH ELECTRONIC LOCKING AND WIRELESS CONTROL INTERFACE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This patent application is for a reissue of U.S. Pat. No. 10,614,646 entitled "Lockout/Tagout System and Method Including Multi-User Lockout Device with Electronic Locking and Wireless Control Interface," which was issued Apr. 7, 2020 from U.S. application Ser. No. 16/261,902 filed Jan. 30, 2019.*

BACKGROUND OF THE INVENTION

The field of the invention relates generally to safety lockout devices for mechanically maintaining industrial control devices in safe operating positions for workers performing maintenance procedures, and more specifically to a lockout/tagout system and method including an electronically actuated multi-user locking device configured to establish a secure lockout/tagout safety chain.

Safety lockout/tagout procedures are in widespread use to ensure worker safety in the performance of otherwise hazardous tasks. For example, electrical power system lockout/tagout devices and processes ensure worker safety in completing maintenance tasks for an electrical power distribution system supplying power to electrical loads. In a typical lockout/tagout procedure, one or more electrical switching devices or disconnect devices in the electrical power system is opened at a designated point or points in the electrical power system to electrically isolate load-side circuitry (and connected electrical loads) from line-side, power supply circuitry. By virtue of the electrically isolated load-side circuitry, workers may accordingly safety attend to tasks on the de-energized load-side of the system without risk of electric shock. To ensure that the electrical isolation of the load-side circuit is maintained for worker safety, the switching/disconnect devices are physically locked out with lockout/tagout devices to prevent the switching/disconnect devices from being re-closed.

While conventional lockout/tagout devices and procedures are effective to provide the desired worker safety, they are nonetheless disadvantaged in some aspects and improvements are desired.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Figure 1:
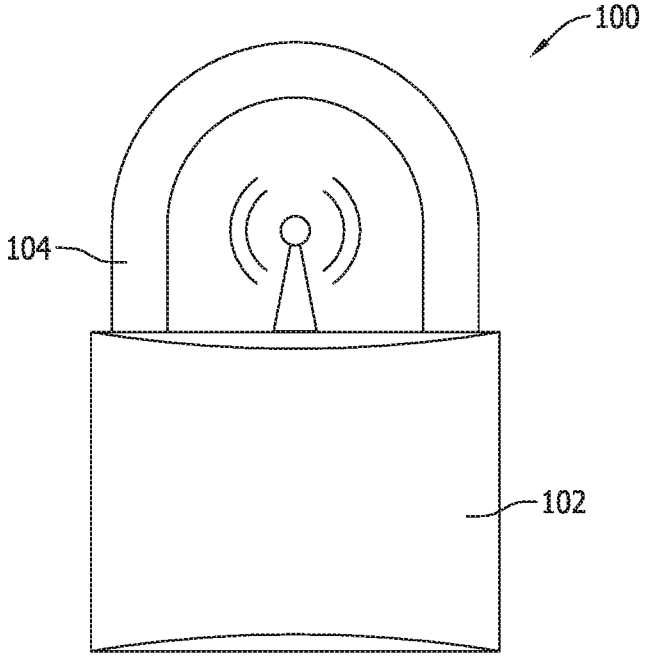
FIG. 1 is a side elevational view of an electronically controlled mechanical locking element for use in an electrical power system lockout/tagout system and method according to an exemplary embodiment of the invention.

Conventional lockout/tagout assemblies and processes using mechanical locking devices (e.g., padlocks) and keys are effective to provide an adequate degree of worker safety in the maintenance of electrical power systems and electrical loads, as well as other types of industrial systems presenting hazardous conditions to workers, but they are cumbersome or inefficient in logistical aspects that would rather be avoided from the perspective of industrial system maintenance and oversight as described below in the exemplary application of an electrical power system.

As conventionally implemented, to ensure that the electrical isolation of the load-side circuit(s) is maintained while workers are performing load-side tasks in an electrical power system, a mechanical locking device such as a padlock is typically installed to selected switching devices or disconnect devices to physically lock them in an opened position (i.e., with switchable contacts in an opened or disengaged position to create an open circuit through the devices), thereby preventing them from being inadvertently re-closed to re-energize the load-side circuitry while workers are performing tasks on the load-side circuitry. In some cases, more than one padlock is used at respectively different locations on an enclosure housing the switch contacts, or a lockout hasp may be provided that accepts multiple padlocks.

Conventional warning tags may be coupled to the padlocks or locking hasps to notify other workers of the safety lockout condition and avoid any possible misunderstanding that could lead to an attempt to remove the padlocks and re-close the opened switching/disconnect devices. In some cases the warning tags may indicate the identity of the person(s) who locked out the switching/disconnect device so that any inquiries can be directed to particular persons. Keys to unlock the padlocks for removal, in order to physically unlock the switching/disconnect devices re-close them, are typically provided only to authorized trained workers who can verify that maintenance procedures are completed and workers are at safe locations before electrical power is restored to the load-side circuitry via re-closure of the switching/disconnect devices.

In certain conventional electrical power system lockout/tagout procedures, different persons involved in or overseeing the maintenance procedures may respectively possess a unique mechanical lock and key combination, with each person installing their mechanical lock at the designated location in the electrical power system to provide enhanced safety assurance and complete a safety lockout chain. Each worker involved can remove their own mechanical lock, but not the mechanical lock of another person. As such, and for example, a cooperative effort of multiple persons is required to remove the respective mechanical locks before the switch device or disconnect device can be re-closed. The coordinated actions required by multiple persons enhances worker safety via cooperation of a group of persons that collectively are much less prone to mistake than a single individual. A secure lockout/tagout safety chain including numerous locking devices respectively operable only by individual persons is therefore sometimes preferred, but poses a number of difficult logistical issues as applied to certain types of power systems.

For instance, as applied to large electrical power systems having large numbers of switching/disconnect devices and correspondingly large numbers of lockout locations the costs of obtaining, managing, and tracking a large lock and key inventory over a relatively large and transient worker population may be substantial. Considering that multiple locks may be used in each lockout location to provide the desired safety chains, a relatively large lock and key inventory is required, which is in turn distributed to or otherwise made available to workers performing or overseeing the needed maintenance and service tasks on the electrical power system and loads. Reducing the number of locks needed and burdens of stocking, re-stocking and tracking of locks and keys, would be desirable.

In another aspect, after the power system maintenance procedures are completed while the lockout/tagout safety chain is in place, each worker is conventionally required to return to the lockout site and physically remove their respective mechanical lock with their own unique key. If any given worker does not have the correct key, however, the desired lockout/tagout procedure cannot be timely completed to remove the locks, leading to increased time and labor costs for workers to complete tasks and/or to an undesirable increase in downtime of the portions of electrical power systems affected. For busy groups of workers in larger electrical power systems, timely locating the required keys, inadvertently attempting to use the wrong keys, or temporarily losing or misplacing keys presents unpredictable and difficult administrative challenges to the timely completion of tasks while ensuring adequate worker safety. More effective tools and simpler lockout/tagout procedures to eliminate delays and costs associated with human errors in these aspects is needed.

In some instances, one or more of the required workers to complete a lockout/tagout of a switching/disconnect device may simply not be immediately available at the lockout site to complete the required actions with the other required workers. In such cases, the workers present at the lockout site may need to wait for the persons to physically arrive at the lockout site to complete the dismantling of the safety chain according to the proscribed procedure. Again, in larger electrical power systems including a number of workers attending to different portions of the power system, coordinating the locations of persons for required lockout/tagout procedures presents challenges from the perspective of efficient allocation of resources. Of course, an inefficient allocation of resources would preferably be avoided.

Even when all the required workers are present with the correct locks and keys, an actual time required to conventionally install and remove each lock one-by-one can be significant over a number of maintenance procedures being performed. The manual, mechanical unlocking of each lock with a physical key can sometimes be awkward or difficult and therefore time consuming to complete, sometimes leading to repeated efforts and trial and error efforts to remove some of the locks that undesirably impact time and labor costs as well as power system downtimes. Damaged or impaired locks or keys may contribute to difficult and time-consuming locking or unlocking operations, but such damage may not be evident to the workers involved.

The issues above are multiplied as the number of workers involved in the lockout/tagout safety chain increases, with each added person incrementally increasing a chance that completion or removal of the safety lockout chain will incur an undesirable delay. For example, when multiple crews each having a number of persons are working simultaneously on load-side circuitry and equipment, consistently ensuring timely availability of every person at the same location to install and remove lockout safety chains in an optimal timeframe in many cases is not possible using conventional lockout/tagout devices and procedures. Considering a two crew scenario wherein each crew has a supervisor and three workers, and a crew supervisor overseeing the supervisor in each of the two crews, there are a total of nine persons (three supervisors and six workers) needing to be coordinated at the same lockout location to complete the desired safety chain. Considering that any of the issues described above may occur to one or more of the nine persons involved, the logistical issues, costs incurred, and electrical power system downtime may undesirably accumulate over larger teams of persons.

Exemplary embodiments of electrical power system lockout/tagout devices, systems and processes are desired below that overcome the issues described above and other disadvantages and limitations of conventional lockout/tagout devices and procedures. As described in detail below, inventive lockout/tagout devices include electronically actuated multi-user locking mechanisms having wireless control interfaces that simplify lockout/tagout procedures dramatically. Technical effects achieved by the devices, systems, and processes include enhanced intelligence of electronically controlled locks and systems enabling user friendly safety lockout chain completion and removal with improved security enhancements to ensure worker safety and address sub-optimal operation of an industrial system such as an electrical power system.

Systems and processes utilizing the electronically actuated multi-user locking mechanisms according to the invention advantageously reduce the number of locking mechanisms needed to complete safety lockout chains and streamline an installation and removal of lockout safety chains via electronic devices carried by the workers. The worker devices communicate wirelessly with the electronically actuated multi-user locking mechanisms, and locking and unlocking of the electronically actuated multi-user locking mechanisms is made via user-friendly interfaces on the worker devices, eliminating a need for physical keys and reducing time needed to complete or remove safety lockout chains while still ensuring adequate safety safeguards.

Improved communication is also made possible by the worker devices and the electronically actuated multi-user locking mechanisms to facilitate safe removal of the lockout safety chain via the electronically actuated multi-user locking mechanisms, without necessarily requiring all of the workers to present at the lockout site, while still ensuring that adequate safeguards are met. Systems and methods including the electronically actuated multi-user locking mechanisms are flexible and scalable to easily accommodate a broad range of industrial systems, including but not necessarily limited to electrical power systems, and are configurable to easily facilitate and accommodate complex safety lockout chains having different hierarchical parameters implemented by different industrial system operators, or at different locations in an industrial system. Oversight of all of the electronically actuated multi-user locking mechanisms and worker participants is also provided via a management system in communication with the electronically actuated multi-user locking mechanisms and the worker devices.

The inventive lockout/tagout devices, systems and methods meet longstanding and unfilled needs in the art in the aspects described above to ensure the safety of workers in the maintenance of an industrial system in an optimized manner is described in reference to the following examples illustrated in the Figures. Method aspects will be in part explicitly discussed and in part apparent from the following description.

While the inventive lockout/tagout devices, systems and methods is described in the exemplary application of an electrical power system including electrical distribution equipment and switches, the inventive lockout/tagout devices, systems and methods likewise apply to other types of industrial systems including control devices having mechanical operating functions and actuators such as valves, positioners, or levers effecting safe shutdown or deactivation of industrial processes in portions thereof, realizing safety lockout positions that are desirably maintained to ensure safe working conditions and therefore ensure worker safety in performing certain tasks. The inventive lockout/tagout devices, systems and methods broadly accrue to secure mechanical lockouts in industrial systems of all types, such as, for example only, chemical processing systems, oil and gas processing systems, power generation and distribution systems, and telecommunications systems presenting parallel issues to those above and that would likewise benefit from the enhanced features of the present invention. The following description is therefore provided for the sake of illustration rather than limitation.

Figure 2:
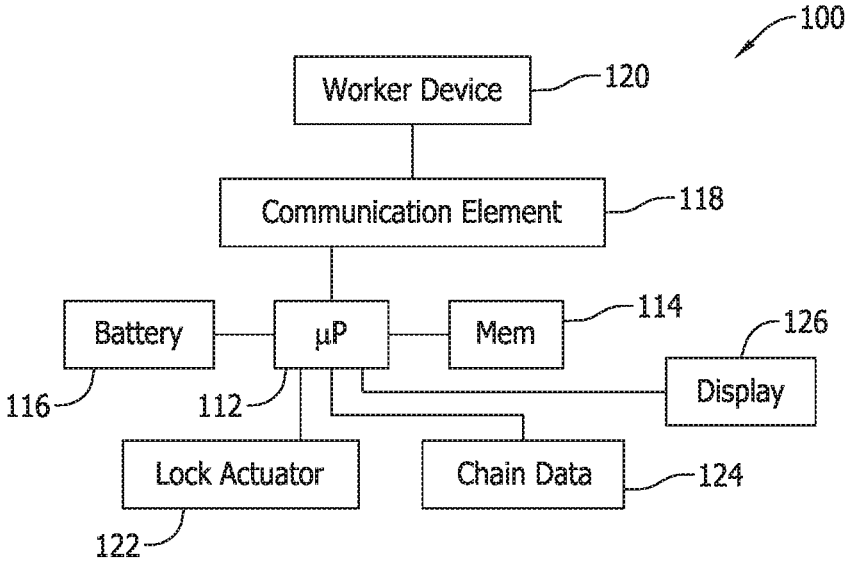
FIG. 2 is a schematic control diagram for the electronically controlled mechanical locking element shown in FIG. 1.
Figure 3:
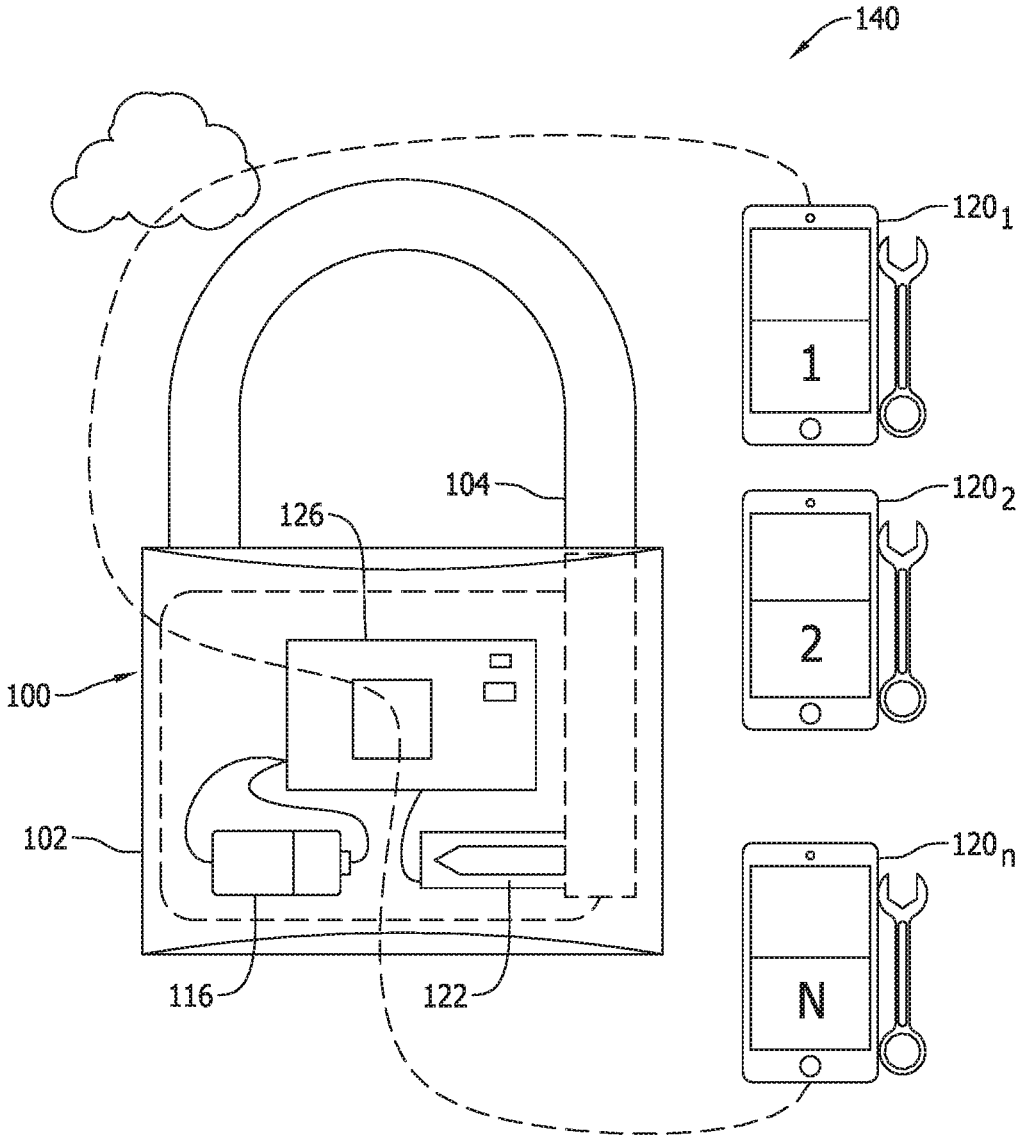
FIG. 3 illustrates the electronically controlled mechanical locking element shown in FIG. 1 in communication with worker lockout/tagout input/output devices in an electrical power system lockout/tagout system and method according to an exemplary embodiment of the invention.

FIG. 1 is a side elevational view of an electronically controlled mechanical locking device 100 for use in an electrical power system lockout/tagout system and method according to an exemplary embodiment of the invention. FIG. 2 is a schematic control diagram for the electronically controlled mechanical locking element 100. FIG. 3 illustrates the electronically controlled mechanical locking device 100 applied to an electrical power system lockout/tagout system and method according to an exemplary embodiment of the invention.

As shown in FIG. 1 the electronically controlled mechanical locking device 100 is provided in the form of a padlock including a body 102 and a U-shaped shackle or shank 104. The body 102 includes an electro-mechanical lock mechanism and a wireless communication element to allow multiple workers/users of the locking element 100 to apply their own electronic secure locking and unlocking codes or credentials to the locking device 100 as described below. The electronic controlled mechanical lock mechanism in the body 102 is operable to mechanically secure or maintain the shank 104 in a locked position relative to the body 102, or to mechanically release the shank 104 from the body 102 for installation of the shank 104 to an electrical switching/disconnect device or for its removal from the electrical switching/disconnect device. By installing the shank 104 and securing it to the body 102 the electrical switching/disconnect device is locked out to ensure worker safety on the de-energized load-side of the electrical switching/disconnect device, and removal of the shank 104 allows reclosure of the electrical switching/disconnect device to re-energize the load-side circuitry and electrical loads. While the electronically controlled mechanical locking device 100 is shown as a padlock in FIG. 1, it is appreciated that the mechanical locking device may be embodied in other forms of mechanical locks besides a padlock in another embodiment.

As shown in the schematic of FIG. 2, the electronically controlled mechanical locking device 100 includes a processor-based microcontroller including a processor 110 and a memory storage 112 wherein executable instructions, commands, and control algorithms, as well as other data and information required to satisfactorily operate the device 100 are stored. The memory 112 of the processor-based device may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based" microcontroller shall refer not only to controller devices including a processor or microprocessor as shown, but also to other equivalent elements such as microcomputers, programmable logic controllers, reduced instruction set circuits (RISC), application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based".

The device 100 includes an on-board power supply such as a battery 100, and a communication element 118 that is operable to wirelessly communicate with a processor-based worker device 120 provided separately from the device 100. Various types of wireless communication are contemplated via the communication element 118 and worker device 120, including, for example only, Near Field Communication (NFC) using a known protocol, short-range communication via known Bluetooth standards and protocol, or Wi-Fi communicating via a Local Area Networking (LAN) according to a known protocols.

Beneficially, when the processor-based worker device 120 is a secure smart phone device no Internet or LAN networking is required for core lockout/tagout functionality of the device 100. All worker participants via the processor-based worker devices 120 and the locking device 100 may contain the safety lockout chain parameters and algorithms to control the locking device 100 as desired. Secure login of locking/unlocking worker participants is also possible. When Internet availability is present, however, LAN networking advantageously allows for certain worker participants to remove themselves from the local blockchain at the device 100 and instead control the locking device 100 from a remote location, such that certain ones of the worker participants need not be physically present at the actual installation site of the device 100 to participate in a safety lockout chain.

The device 100 also includes a lock actuator 122 such as a low power solenoid (also shown in FIG. 3) in the body 102 to lock or release an end of the shank 104 within the body 102 as the lock actuator 122 is moved between locked and unlocked positions. The lock actuator 122 is operable by the processor 112 according to a predefined algorithm, chain data components and control logic, represented at 124 in FIG. 2 and implemented on a circuit board as shown in FIG. 3 to decide whether or not to operate the lock actuator 122 to move it to the unlocked position and release the shank 104. The shank 104 may be spring-loaded in the body 102 such that once the shank 104 is released, the shank 102 is ejected from the body 104 so that the locking device 100 can be easily removed from an electrical switching/disconnect device in an electrical power system.

The device 100 may optionally include a tagout element in the form of a display 126 providing informational feedback to the worker(s) present at the site of installation of the locking device 100. In different embodiments, the display 126 may include a liquid crystal display (LCD) display screen, a light emitting diode (LED) display screen, and LCD/LED display screen, an organic light emitting diode (oLED) display screen, or another known type of display screen capable of functioning as described herein. The display 126 may be a single color display or multiple color display, may be provided with or without backlighting, and may be factory set to show critical power and setup information to the end user, installer or overseer.

The display 126 when present may eliminate any need for conventional warning tags or notices to advise workers of the safety lockout and may provide basic or detailed information. Of particular note, the display 126 may beneficially indicate the number of worker participants that have participated in the locking process. Information presented in the display 126 may also be presented to the worker participants via the processor-based worker devices 120 in communication with the locking device 100, such that the display 126 need not be included in some embodiments. In some contemplated embodiments, however, if desired conventional tags and the like may be used in combination with the locking device 100 (in lieu of or in combination with the display 126) to identify the safety lockout and/or provide warning or notice to other workers in the area that may not be involved in the maintenance tasks and procedures that required the safety lockout.

As shown in the system 140 of FIG. 3, n number of worker participants, each having a respective processor-based worker device $\mathbf{120}_1$, $\mathbf{120}_2$ . . . $\mathbf{120}_n$ may wirelessly interface with the same locking device 100 to establish a safety lockout chain. Each worker participant via each processor-based worker device 120 may participate in a locking of the device 100 with a series of unique electronic locking commands made via the respective worker devices 120 of each worker. The device 100 may be unlocked (i.e., the shank 104 may be released via the displacement of the lock actuator 122) only after a corresponding series of unique electronic unlocking commands are received from each respective worker participant made via the respective worker devices 120. The chain data processing components 124 compares and confirms the locking and unlocking commands and data to ensure that all participating workers are safely accounted for before the device 100 is unlocked and opened.

In the example shown in FIG. 3, the first locking command is made by a first worker via the first respective processor-based worker device $\mathbf{120}_1$ which the processor 112 of the worker device $\mathbf{120}_1$ accepts as locking command "1", and in turn the processor-based worker device $\mathbf{120}_1$ displays the number 1 to the worker as confirmation that he or she is the first worker to lockout the device. The second locking command is then made by a second worker via the second respective processor-based worker device $\mathbf{120}_2$ which the processor 112 of the working device $\mathbf{120}_2$ accepts as locking command "2", and in turn the processor-based worker device $\mathbf{120}_2$ displays the number 2 to the worker as confirmation that he or she is the second worker to lockout the device. Subsequent workers make locking commands via respective processor-based worker devices in a similar manner such that the safety lockout chain is scalable to any number n or workers having n processor-based worker devices communicating with a single locking device 100.

One all of the n workers have communicated locking commands to the locking device 100 via their processor-based worker devices, the device 100 remains locked unless all of the n workers involved in the safety lockout chain issue unlocking commands to the locking device 100 via their processor-based worker devices. The processor 112 of the locking device 100 may compare locking and unlocking commands and data to confirm that each worker that issued a locking command via his or processor-based worker device also issued an unlocking command via his or her processor-based worker device. If less than n of the required unlocking commands are received from the n workers involved, the locking device 100 remains locked. The locking device 100 will open only after the $n^{th}$ unlocking command is received, enabling a variety of different safety lockout chains to be established having varying degree of complexity to enhance worker safety.

For example, hierarchical safety chains can easily be established via the single locking device 100, wherein the processor 112 of the locking device 100 not only accounts for all of the n workers in the safely lockout chain, but requires unlocking commands to be received in a particular order for at least some of the workers involved. As such, the locking device 100 may easily be configured so that a leader or supervisor of worker team or crew may not successfully unlock the locking element with an unlock command unless other corresponding team/crew members have previously issued unlock commands. Specifically, an attempt by a supervisor to issue an unlock command before the subordinate worker team has each issued an unlock command will either not be permitted via the processor-based worker device 120 or will not be effective when received by the locking device 100. That is, the locking device 100 may ignore an unlocking command made by the supervisor via the respective processor-based worker device unless the unlocking command is the last of the n unlocking commands to be received. In this example, the device 100 will not unlock until all team members (supervisors and subordinates) have issued unlock commands in a correct sequence. An electronic generation and receipt of locking and unlocking commands via the processor-based controls of the locking device 100 and/or the processor-based worker device 120 of each worker obviates a need for physical keys to be carried by all of the worker participants in the safety lockout chain. In some cases, and as mentioned above, electronic generation and receipt of locking and unlocking commands may also avoid a need for every worker participant to be physically present at or near the actual location of the device 100 in order to establish or remove a secure lockout/tagout safety chain.

It is understood that in a given electrical power system, multiple locking devices 100 can be provided for use by the same or different worker participants to respectively lockout the same or different switching/disconnect devices in the electrical power system simultaneously. That is, multiple locking devices 100 may indeed be present, but since each locking device 100 communicates with multiple processor-based worker devices such that the total numbers of locks required to complete lockout/tagout safety chains is a fraction of what a conventionally implemented lockout/tagout safety chain would entail. Specifically, for each lockout location in the electrical power system, a reduction of the number of locks required at each location is governed by the relationship (n−1)/n. As such, when n is 2, the lock reduction is ½ or 50%, when n is 3 the lock reduction is ⅔ or 67%, when n is 4 the lock reduction is ¾ or 75%, etc. The cost savings via reduced number of locking devices 100 is therefore substantial relative to conventional lockout/tagout schemes involving one-to-one numbers of locks and workers.

The processor-based controls of the locking element 150 and/or the processor-based worker devices 120 also facilitate much flexibility in the operating algorithms to meet still other safety concerns and provide enhanced operation. For example, Boolean chain logic for multiple participants, locks and permissives in the locking devices 100 allows for rapid creation of customizable job site specific safety plans. Not only can permissives be defined in the chain to lock out multiple energy sources in one chain (equals), hierarchically, sequence interlocking or any combination in the power system, but in contemplated embodiments Wi-Fi and Internet established chains may also include permissives such as predetermined time(s) of day, predetermined weather conditions or environmental conditions, security system considerations, or other inputs that will further restrict an ability of safety lockouts to be removed by participating workers unless a complete set of predefined conditions are satisfied. As a simple example of this type, if a maintenance procedure can be expected to take one hour to complete, the locking device 100 and/or processor-based worker devices 120 can be configured to preclude unlocking commands from being sent or acted upon within a one hour window from the completion of the lockout safety chain.

The locking devices 100 beneficially include a number of fail-safe components and features as well. For example, once the locking device 100 is locked (i.e., the shaft 104 is locked within the body 102) it remains locked in the event of a power loss. Specifically, a dead battery 116, or removal or replacement of the battery 116 will not result in loss of lock chain data, such that the security of the safety chain in the device 100 is unaffected, and the device 100 is still operable to unlock only when all participating workers who issued locking commands have issued unlocking commands according to any hierarchy or preferences in the operating algorithm(s) of the device 100.

Additionally, a state of charge (SOC) of the battery 116 is sensed or otherwise determined by the controls of the device 100, and is communicated and made available to worker participants via their processor-based worker devices 120 to facilitate proactive battery management or battery replacement to avoid any delay in unlocking of the device 100 when the safety lockout chain is no longer needed at the completion of maintenance tasks on the load-side circuitry or electrical loads. In cases wherein the battery 116 is rechargeable, state of charge communication also provides opportunity for one of the workers to charge the battery 116 via their processor-based worker device 120 or another appropriate power source.

As a further fail-safe measure, a loss of signal/communication with one of the worker devices 120 will not break the chain established via the device 100 until the affected worker/user regains connection and issues the proper unlock command that is confirmed by the device 100.

Beneficially, the controls of the locking device 100 may also sense or detect malfunctioning/damaged or broken components in the device 100, and desirably may generate and communicate malfunction/damaged/broken lock alerts to active worker participants via their participating worker devices 120. Real-time operating status of each lock is possible.

The device 100 is generally designed to be rugged and tamperproof, while still providing antenna access for NFC, Bluetooth and/or Wi-Fi connections to be established with processor-based worker devices 120.

While exemplary control components are described and illustrated in the locking device 100, it is recognized that in further embodiments similar control components, circuit boards, operating algorithms, etc. can be built-in or embedded in electrical switches, electrical disconnect devices, electrical circuit breakers or any other energy control device to achieve the switching/disconnect functionality to isolate load-side circuitry and electrical loads in the power system. As such, when the appropriate controls and intelligence are built-in to the electrical device similar lockout/tagout safety chain functionality could be realized apart from the intelligent locking device 100 described above that is separately provided from an electrical device.

In contemplated embodiments, participant workers can access their electronic lock via their smart phone device 120 at the location of the locking device 100 or via an Internet portal established by the smart phone device 120 or another computing device (e.g., a tablet device or a notebook/laptop computer). Unique electronic and software features described above allow for a secure lockout/tagout safety chain to be established. By providing a single wirelessly controlled locking device 100, multiple workers can use the same locking device 100 in a secure lockout/tagout safety chain. Because smart phone devices 120 may also communicate peer-to-peer with one another, only one of the workers needs to be physically present at the physical location of the locking device 100 to successfully and securely unlock the lock. Each person in the safety chain can remotely control their secure status of the electronic lock as needed or as desired, which can be collectively communicated to the controls of the locking device 100 via only one of the smart devices 120 at the location of the locking device 100. The multi-user locking mechanism 100 with peer-to-peer communications of worker devices 100 creates an unbreakable chain, while allowing for user-friendly locking and unlocking of the device 100 in reduced timeframes than conventional manual locking and unlocking of different locks and different persons having different keys. The cellular and WI-FI communication capabilities of smart phones and tablets further allows convenient ability for workers to personally communicate with one another to verify that each worker is in a safe location prior to removal of the safety chain.

In some instances using location services of smart devices 120 carried by the workers, the locations of each worker can be electronically tracked so that at least certain workers (e.g., supervisors) can verify that other workers are safe before issuing unlock commands. This facilitates remote unlocking commands issued by a supervisor who is not at the actual lockout site, as well as allows possible remote unlocking commands by other workers to avoid otherwise conventionally incurred delays when worker participants are not available to timely gather at the lockout site to remove the safety lockout chain as a group. More efficient allocation of worker resources, without compromising safety assurance, is therefore realized.

Figure 4:
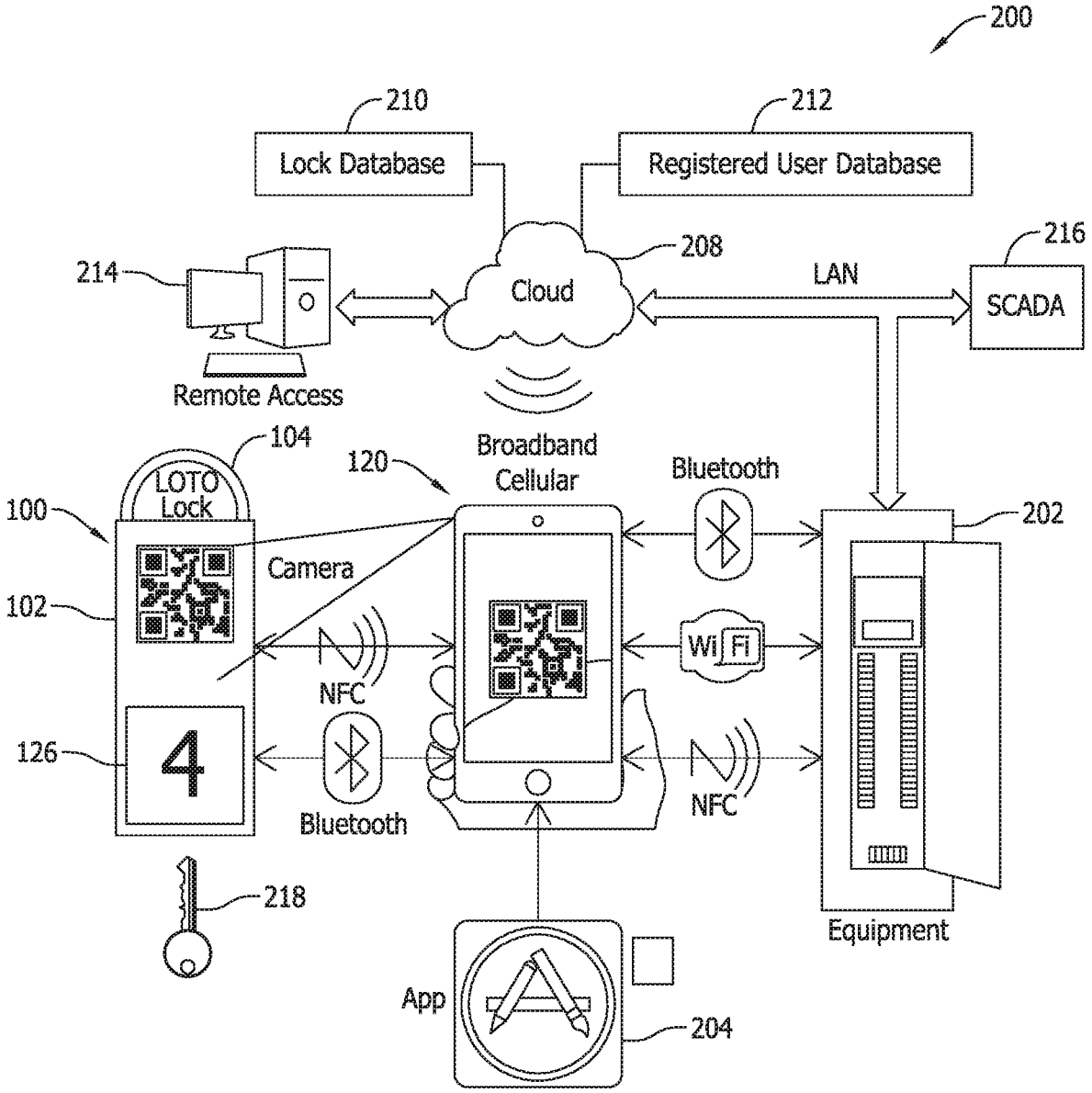
FIG. 4 is an exemplary schematic diagram illustrating an exemplary electronic lockout/tagout system architecture according to an exemplary embodiment of the invention.

FIG. 4 is an exemplary schematic diagram illustrating an exemplary architecture of an electronic lockout/tagout system 200 according to an exemplary embodiment of the invention.

The system 200 includes the locking device 100 in communication with processor-based worker lockout/tagout devices 120 each serving as input/output devices for controlling the locking device 100. The processor-based worker devices 120 are also shown in communication with controls of the electrical equipment 202 via NFC, Bluetooth, or Wi-Fi protocols. The electrical equipment 202 in the example shown includes a number of switching/disconnect devices that may be individually opened and locked out with the locking device 100, or selected switching/disconnect devices may be opened with the locking device 100 being utilized on an enclosure of the equipment, for example, to lock the cover of the equipment 202 closed and preventing access to the switching/disconnect devices in the equipment. The worker device 120 may confirm both that the proper switching/devices have been opened and that the lockout safety chain has been established via the locking device 100.

The locking device 100 in the example of FIG. 4 includes a machine readable bar code such as a quick response code (QR code) that is easily detected and interpreted by the camera of the smart worker device 120 when provided with an executable software application (app) 204. The locking device 100 may be identified to the smart device 120 via the QR code, and the locking/unlocking commands communicated to the locking device 100 allow the locking device 100 to identify the smart devices 120. In the example shown, four workers have issued locking commands to complete a safety chain through the locking device 100, so the display 126 of the locking element 100 indicates the number 4.

The worker device 120 may communicate via a broadband cellular network or via Wi-Fi with other smart devices 120 carried by the other workers, as well as a cloud-based server system 208 including a lock database 210 and a registered user database 212. A remote access computer station 214 is shown interfacing with the cloud-based server system 208, and a registered worker or a system administrator may access the remote computer station 214 for interaction with the system 200. While one remote access computer station 214 is shown, it is understood that any registered user may remotely access the cloud-based server system 208 using login information made available as part of system enrollment/registration processes.

The cloud-based server system 208 is also shown in communication with the electrical equipment 202 and a Supervisory Control and Data Acquisition (SCADA) system 216. Accordingly, the safety lockout of the equipment 202 and status of affected portions of the power system is confirmed via the SCADA system and fed back to the cloud-based server system 208 where it may be accessed on the user devices. The identities of the workers issuing lock and unlock commands to the locking devices may also be tracked and communicated over the cloud-based server system 208, or peer-to-peer amongst the registered worker users having the software application that is received on each device 120 after successfully registration on the system. In general, and by virtue of the system 200, power system overseers can see all the locking devices 100 in use in the power system at any given time including pertinent participating worker identification and data to ensure proper use of the system. The system 200 is secure in that it is operative only with respect to registered locking devices 100 and registered devices 120 of worker participants. Any attempt to use an unregistered lock or any communication by an unregistered worker device will be detected via comparison to the registered lock database 201 and registered user database 120 as communications are made, and appropriate alerts or notifications are made regarding unregistered locks are users so that they may be promptly investigated.

A master key 218 is also shown that may be used in an emergency to over-ride an established lockout safety chain via a manual, physical use of the master key 218. The master key 218 in contemplated embodiments is restricted for use only by certain persons, but is not unique to any of the locking devices 100 provided. A single master key 218 may therefore open any of the locking devices 100 provided in the system, avoiding any need to locate unique keys to physically unlock the locking devices 100 that are in place.

Figure 5:
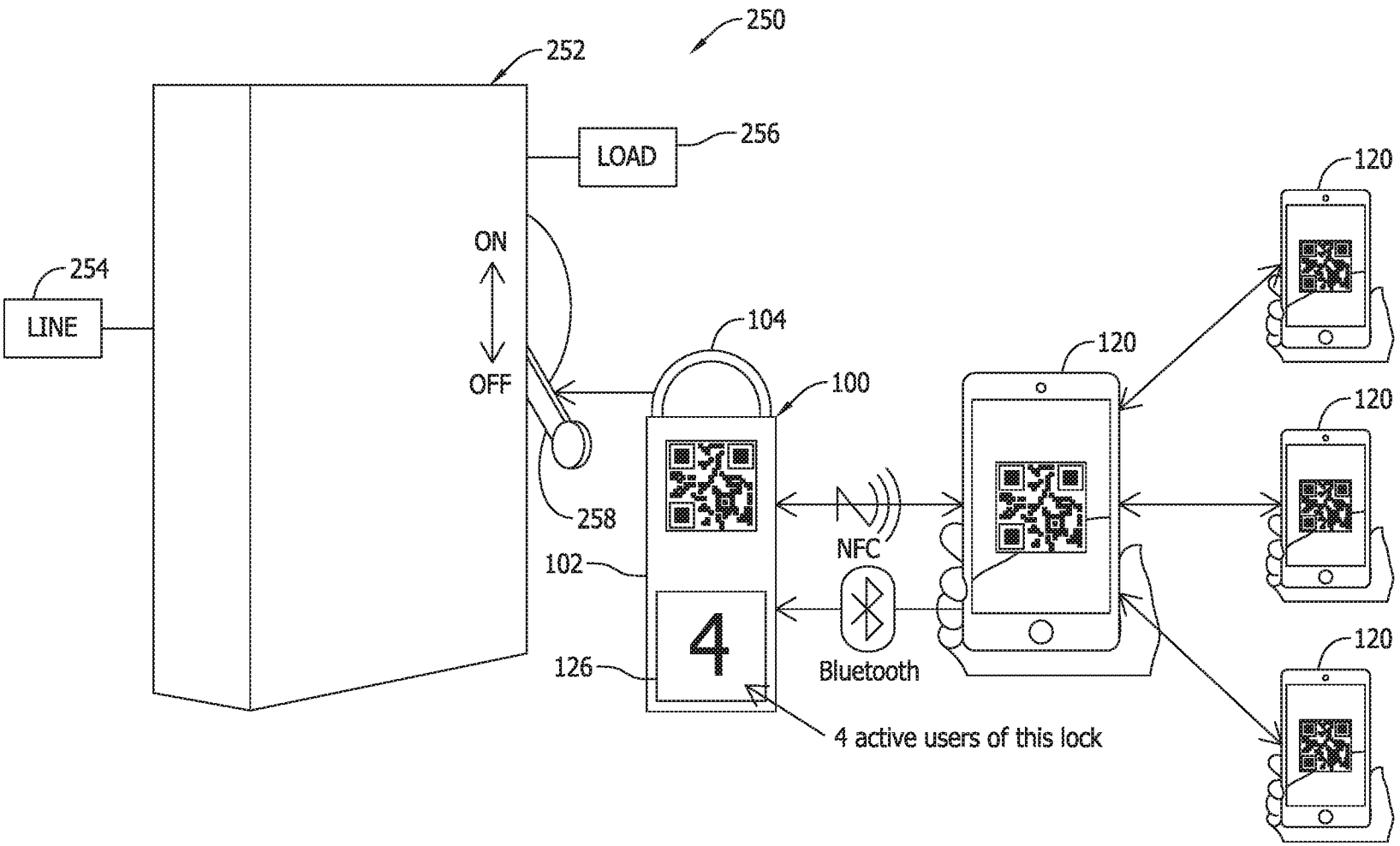
FIG. 5 illustrates a portion of the system shown in FIG. 4 applied to an electrical switching device in an electrical power system.

FIG. 5 illustrates a lockout/tagout system 250 applied to a an electrical switching device 252 in an electrical power system. The switching device 252 completes (or not) an electrical connection between line circuitry 254 and load circuitry 256 that is determined by a switch actuator 258 accessible from an exterior of the device 252. As shown in FIG. 5, the switch actuator 258 is a switch lever that has been rotated from an "on" position to an "off" position to electrically disconnect and isolate the load circuitry 256 from the line circuitry 254 via displacement of switch contacts in the device 252. The shank 104 of the registered locking device 100 is installed through a lock aperture to physically lock and maintain the switch actuator 258 in the off position so that workers can safely attend to load-side maintenance tasks in the power system. The safety lockout chain is accomplished in the example of FIG. 5 by four registered workers having respective processor-based worker devices 120. One of the worker devices 120 is shown proximate the locking device 100 that in turns, communicates peer-to-peer with the other worker devices 100 having the software application 204 (FIG. 4) needed to identify and communicate with the locking device via the QR code or other machine readable element. The worker devices 120 are therefore electronically linked to an identified the locking device 100 and vice-versa with each worker being able to see and confirm that the other workers have successfully issued their electronic locking commands to complete the desired safety chain.

At the completion of the maintenance procedure, and as depicted in FIG. 5, at least one of the workers needs to return to the location of the locking device 100 to communicate with the locking device 150 that only has NFC or short range communication capability. Locking commands may be communicated from any worker present and also from remote workers via locking commands communicated peer-to-peer from the device of each participating worker to the worker device(s) presented at the location of the locking device 100. A streamlined removal of the safety lockout chain is therefore realized that ensures worker safety without necessarily requiring all of the workers to gather at the site of the locking mechanism. In a contemplated example of this type, a supervisor could receive unlocking commands by a subordinate team of workers via peer-to-peer communication with the worker devices of the team members, with the supervisor completing the removal of the safety chain at the site of the locking device 100 by issuing his or electronic lock command while communicating the lock commands of the other workers via the worker device of only the supervisor, who may then remove the locking device 100 and rotate the switch actuator 258 back to its on position to re-energize the load-side circuitry 256.

Figure 6:
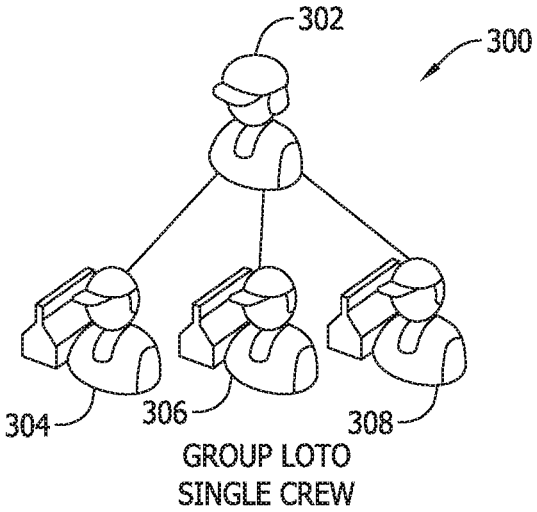
FIG. 6 illustrates a single crew lockout/tagout device hierarchy in an exemplary electrical power system lockout/tagout system and method according to an exemplary embodiment of the invention.

FIG. 6 illustrates a single crew lockout/tagout device hierarchy 300 in an exemplary electrical power system lockout/tagout system and method according to an exemplary embodiment of the invention. A supervisory 302 may oversee a crew of three workers 304, 306 and 308. The hierarchy is set up so that supervisor 302 cannot successfully issue a lockout command unless or until all three of the workers 304, 306 and 308 have issued their own electronic locking commands via their respective worker devices 120. The workers 304, 306 and 308 can individually issue electronic commands at the site of the locking device 100, or the supervisor 302 can collect the electronic locking commands of the workers 304, 306 and 308 before issuing the final electronic unlock command at the site of the lock device 100. In other contemplated embodiments, the supervisor could remotely issue the final unlocking command from a remote location, which may be communicated peer-to-peer to a worker present at the installation site of the locking device 100 who can transmit the supervisor unlocking command by proxy to the locking device 100. Of course, the hierarchy could alternatively be set up so that the supervisor issues the first unlocking command (either remotely or locally) that can then be followed by the remaining workers to complete the removal of the safety lockout chain. Various adaptations are possible in the sequencing of lock commands by the supervisor and worker teams.

Figure 7:
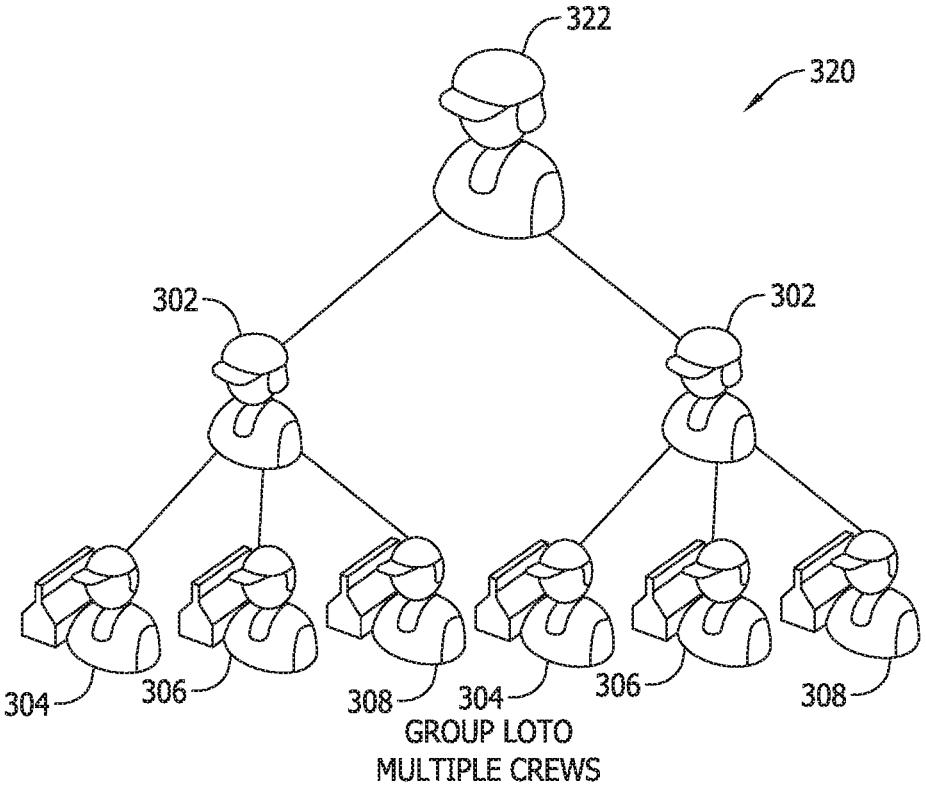
FIG. 7 illustrates a multiple crew lockout/tagout device hierarchy in an exemplary electrical power system lockout/tagout system and method according to an exemplary embodiment of the invention.

FIG. 7 illustrates a multiple crew lockout/tagout device hierarchy 320 in an exemplary electrical power system lockout/tagout system and method according to an exemplary embodiment of the invention. In the hierarchy 320 of FIG. 7, a second supervisor 322 oversees the supervisor 302 each overseeing a crew of three workers 304, 306 and 308. The hierarchy may be set up, for example, to operate so that the locking device 100 may be unlocked via an unlocking command of the supervisor 322 that is issued only after the supervisors 302 have each issued unlocking commands. Again, various adaptations in the hierarchy are possible, but the scalability of the system to include additional numbers of crews and supervisors is now believed to be apparent. In the illustrated example, 9 persons (three supervisors and two teams of three persons) can conveniently indirectly or directly communicate with a single locking device 100 to complete a secure safety lockout chain, as well as to remove the lockout chain without incurring the drawbacks of conventional lockout/tagout procedures and processes.

Figure 8:
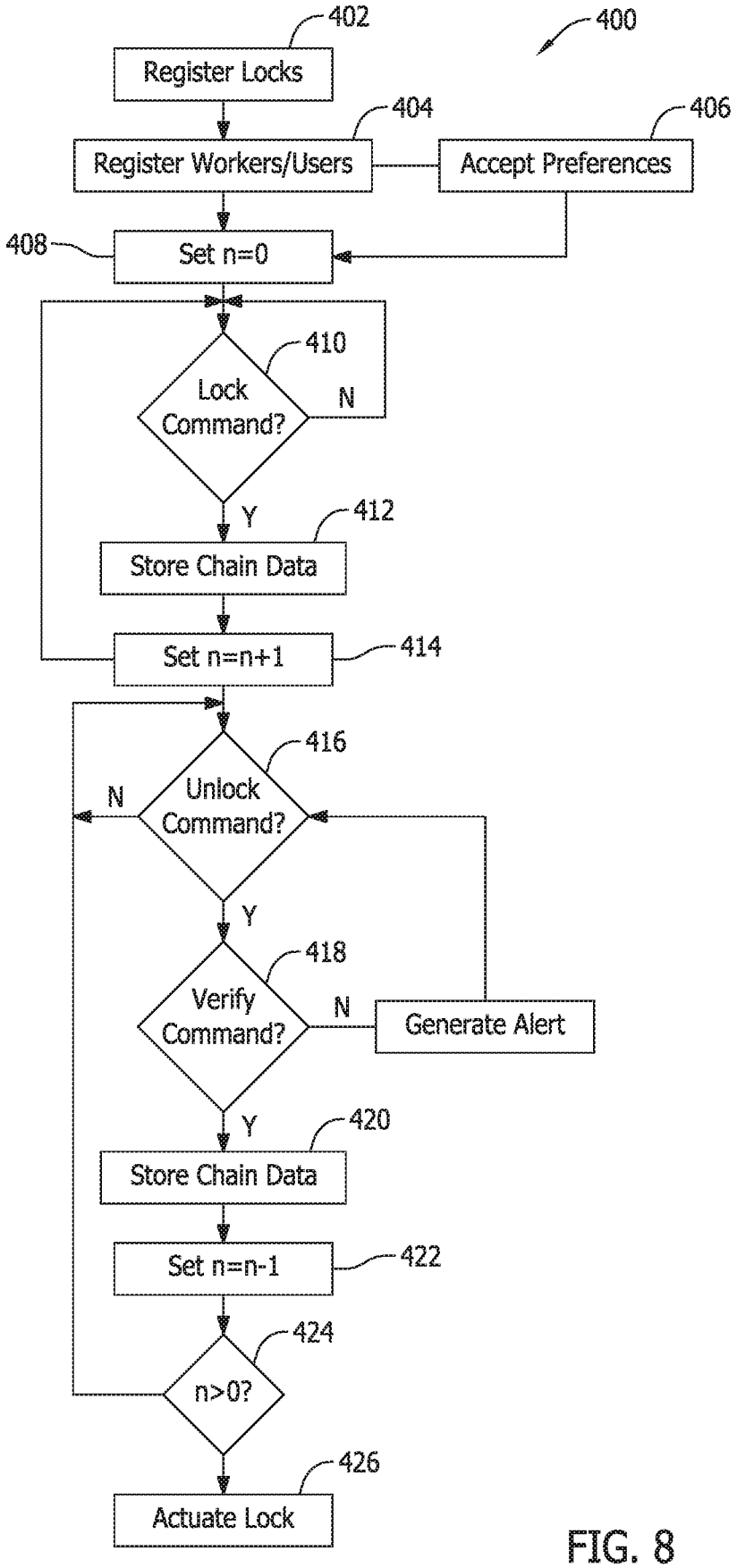
FIG. 8 is an exemplary flowchart of an exemplary electrical power system lockout/tagout method according to an exemplary embodiment of the invention.

FIG. 8 is an exemplary flowchart of an exemplary electrical power system lockout/tagout method 400 according to an exemplary embodiment of the invention. The method may be implemented algorithmically in the pertinent devices of the systems described above. In contemplated embodiments, the worker devices include IOS or Android operating systems and software apps for smart device control and management of locks, as well as commissioning of locking device and worker devices for use in completing safety lockout chains. Various communication and connectivity protocols (Wi-Fi, Bluetooth, NFC, LAN) allow for coordinated linking of equipment and locks to provide the most secure safety environment for lockout/tagout service. When available, LAN communication may tie together with SCADA systems and equipment for complete safety management and logging, inventory management and maintenance scheduling of the power system.

At step 402 the locks are registered for use with the system and at step 404 the workers/users are registered. Steps 402 and 404 may be accomplished via remote access through a web portal for control and management of locks for use by registered persons only. Unique bar codes, QR codes, or other machine readable elements may be provided for self-identification of the locking devices 100 via lock serial number or other identifying parameters, can also be used for part of commissioning procedure at steps 402 and 404 for the locks and for electronically assigning ownership of the locking devices 100 to selected ones of the registered users. The physical locking device 100 can be programmed and or accessed by Bluetooth or Near Field Communications such that the locking device 100 is only electronically visible to a registered person accessing it with a registered software application on a pre-approved device. In contemplated embodiments, each locking device 100 will be assigned a primary owner with first lock action, and a master override owner can also be assigned during commissioning.

Cloud services for apps, storage, account management, networking, etc. may be employed for lock and worker registration and setup purposes. User database populating and registration is performed in contemplated embodiments wherein individual users must register with database 212 via an internet portal app or directly with a system administrator. For security, software application use and database access is strictly controlled by system administrators.

Locks are likewise strictly overseen via registration by serial number and primary owner/registered user. The system checks for existing or new locks as the system operates. Existing, pre-registered locks are ready to use by registered workers, while new locks require administrator approval and activation as they are introduced to the system. For new locks, a registered user must be assigned as lock owner having master control of the lock. Locks may be assigned to a single owner identified by an employee number or other identification number. Each registered lock and owner are secured in control databases.

At successful completion of steps 402 the registered locks may be configured with any preferences at the system administrator level or via the end user/worker level using the application software provided or made available to registered users/workers. The preferences are accepted at step 406 and may include hierarchical parameters, date and time restrictions, environmental considerations, weather conditions, security systems, etc. as described above or known in the art for desirable inputs or restrictions on the removal of a safety lockout chain. Steps 402, 404, 406 may provide locking and unlocking profiles to meet the needs of specific installations in a given electrical power system or another industrial system and are preparatory steps to the remaining steps that are performed on a per lock basis by the processor-based controls therein as they are installed to lockout electrical devices and equipment in an opened or disconnected state de-energize load-side circuitry.

At step 408, n is set to zero and the locking device 100 awaits at step 410 receipt of an electronic locking command communicated by one of the processor-based worker devices 120 of a registered worker. In contemplated embodiments, a smart IOS or Android worker device 120 is required to issue locking and unlocking commands. At least one such smart device must be within visual distance range for an initial command to be communicated to the locking device 100. The initial locking command in contemplated embodiments must be made by the lock owner, and a smart device software app of the lock owner's worker device 120 electronically locks the locking device while the smart device 120 is present to initialize the electronic locking of the device 100.

The communication of the initial locking command may be based on data and information obtained from a machine readable element on the locking device 100 that identifies the registered lock. Only a locking command including predetermined data arranged in a predetermined format or protocol will be recognized by the locking device 100, such that any attempt to communicate with a locking device by an unregistered using having a user device without the registered software application cannot successfully communicate with the locking device.

Assuming that the locking command is recognized at step 410, chain data is stored in the locking device at step 412. At step 414 n is reset to n plus 1 and the method returns to step 410 and the locking device 100 awaits another lock command. Subsequent locking commands can be issued to the same locking device 100 and may be received locally from worker devices of other registered workers having the proper electronic locking credentials as registered users. Any number of n users can issue lockout commands to complete a safety lockout chain of any desired length via steps 412 and 414. Each lockout command is unique and completes a link in a safety chain in combination with prior lockout commands that are also unique and distinguishable from one another. The number of links defines the length of the safety chain, and as such n workers can define a safety chain having a length equal to n, wherein n is an integer greater than one to ensure that coordinated action of more than one user is required to lock and unlock the locking device 100. As each additional locking command is accepted, each registered user can see the lockout chain via their smart device app or by logging onto web portal to access the system data.

Once electronically locked by the number n of registered users to complete the safety lockout chain, the device 100 remains locked until with the safety lockout chain is successfully removed as described next. As long as the safety lockout chain is in place, however, the display 126 of the locking device 100 may provide lockout data such as lock serial number, number of electronic locks in place, ownership information etc. so that each worker participant can confirm the successful lockout commands or refer to the data later to understand the nature of the lockout and the persons involved. Also, workers that are not involved in the lockout safety chain can see at the location of the locking device 100 that the lockout in place and can see basic information regarding the length of the safety chain, the ID of the lock on the system, the ID of workers who created the safety chain, etc.

At step 416, the locking device 100 awaits receipt of an electronic unlocking command communicated by one of the processor-based worker devices 120 of a registered worker. In contemplated embodiments, at least one registered user must be present at or near the site of the lock device 100 to commence and complete an unlocking operation via for example, NFC or Bluetooth communication. The communication of an unlocking command may be based on data and information obtained from a machine readable element on the locking device 100 that identifies the registered lock. Only an unlocking command including predetermined data arranged in a predetermined format or protocol will be recognized by the locking device 100, such that any attempt to communicate with a locking device by an unregistered using having a user device without the registered software application cannot successfully communicate with the locking device.

Assuming that the unlocking command is recognized at step 410, the command is verified at step 418. The verification may be made by comparing the chain data stored at step 412 to data received in the unlocking command to confirm that the unlocking command was sent by one of the n worker devices that issued one of the locking commands when the lockout safety chain was established. The verification may also include evaluation of any of the preferences accepted at step 406 that must be satisfied.

If the unlocking command is verified at step 418, chain data is stored at step 420. At step 422 n is reset to n minus 1 and at step 424 the result is compared to zero. If n is greater than zero at step 424 the device returns to step 416 and awaits another unlocking command by another one of the n users that established the lockout safety chain.

If at step 422 n is not greater than zero, then all of the n workers are accounted for by the unlocking commands received, and at step 426 the actuator in the locking device 100 is operate to unlock the device 100 for its removal from the electrical equipment, allowing it to be re-closed to re-energize load-side circuitry after load-side maintenance tasks have been safely completed by the workers involved.

If the unlocking command is not verified at step 418, the unlocking command is ignored (i.e., does not result in a link in the safety chain being removed) but logged or stored in the memory of the locking device 100. Since an unverified unlocking command indicates an error by an authorized user (e.g., an unlocking command that is out of sequence but is made by a registered user involved in the safety lockout chain) or an improper communication by a user device that is not registered or a worker that is not part of the lockout safety chain, appropriate alerts and notifications may be generated and communicated on the system. Informational feedback may be provided on the display of the locking device 100 as an indication to the user that an unlocking command or attempted communication was not successful, including an optional error code or information to the user why the command or communication was rejected.

The method 400 may optionally include numerous event logging and notification steps for additional security and record keeping purposes. For example, each activation and use of a locking device 100 may be permanently logged in one of the system databases. As new active lock users add their electronic locking credentials to an existing locking device 100, a notification may be broadcast to all other users/participants in the safety chain established through the locking device 100.

Likewise, all electronic requests/commands to unlock a locking device 100 may be logged on the system and broadcast to all active users of the lock as a group. For instance, the lock commands may be communicated to the locking device 100 via near field communication or short range communication techniques by a processor-based worker device 120, with the processor-based worker devices also communicating the same unlock commands over the cellular network, a Wi-Fi network, or a LAN network. The communication of the unlock commands can be controlled by the application software running on the processor-based worker devices 120, and the communications to the locking devices 100 and to the lockout/tagout management system may be in the same or different format. The date/time of the command may be recorded, together with processor-based worker device ID, registered user ID, employee ID and other pertinent details. Detailed logs, archives, and report generation capabilities in the system and method are therefore present to assess the proper use and operation of the system in detail.

As another safeguard, any access of a locking device 100 by a smart worker device or any communication to a locking device 100 is also logged on the system and communicated to active users of the lock as a group. For example, a reading of the machine readable element on the locking device by a registered user device may be captured and recorded as an event on the system and method so that other workers can be advised of a worker present at the lock location.

System administrator functions and steps in the method may also provide complete visibility to the entire system, including all active locks, safety chain and status data, and any notifications generated by the system with complete electronic overriding capability.

Lockout/tagout systems and processes of the invention, as described above for an electrical power system or another industrial system, include multiple components distributed among a plurality of computing devices. One or more components may be in the form of computer-executable instructions embodied in a computer-readable medium. The systems and processes are not limited to the specific embodiments described herein, however. In addition, components of each device, each system, and each process can be practiced independently and separately from other components and processes described herein. Each component and process can also be used, however, in combination with other devices, systems and processes as desired.

The above-described examples of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the described embodiments above. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

For example, one or more computer-readable storage media may include computer-executable instructions embodied thereon for wireless interfacing a processor-based multi-user electronic lock with a plurality of processor-based worker devices. In this example, the computing devices implementing the multi-user locking devices and the processor-based worker devices may each include a memory device and a processor in communication with the memory device, and when executed by the processor the computer-executable instructions may cause the processor to perform one or more steps of a method such as the method described and illustrated in the example of FIG. 8.

Having described devices and applicable operating algorithms functionally per the description above, those in the art may accordingly implement the algorithms via programming of the controllers or other processor-based devices. Such programming or implementation of the concepts described is believed to be within the purview of those in the art and will not be described further.

The benefits and advantages of the inventive concepts are now believed to have been amply illustrated in relation to the exemplary embodiments disclosed.

An embodiment of a multi-user lockout/tagout device for an industrial system such as an electrical power distribution system has been disclosed. The multi-user lockout/tagout device includes a mechanical locking element, a lock actuator acting upon the mechanical locking element, and a processor-based control element in communication with the lock actuator to selectively control a position of the lock actuator with respect to the mechanical locking element when the mechanical locking element is coupled to an electrical device in the electrical power distribution system. The processor-based control element is configured to: wirelessly accept an electronic locking command from each of a number n of processor-based worker devices of respective workers responsible to perform a maintenance task in the electrical power system; store electronic locking command data as each electronic locking command is accepted, and in response to the accepted locking commands operate the lock actuator to lock the mechanical locking element; wirelessly accept an electronic unlocking command from each of the same number n of processor-based worker devices of respective workers responsible to perform a maintenance task in the electrical power system; store electronic unlocking command data as each electronic unlocking command is accepted, and in response to the accepted unlocking commands operate the lock actuator to unlock the mechanical locking element; wherein the number n is an integer greater than 1 to realize a lockout safety chain of a desired length.

Optionally, the multi-user lockout/tagout device further includes a display providing lockout data corresponding to the accepted locking commands. The multi-user lockout/tagout device may also include a communication element, the communication element configured to receive an electronic locking command or an electronic unlocking command. The communication element may be configured to conduct near field communication or short range communication with the number n of processor-based worker devices. The multi-user lockout/tagout device may also include a machine readable element identifying the multi-user lockout/tagout device to each of the number n of processor-based worker devices. The multi-user lockout/tagout device may include a battery, and the processor-based control element may be further configured to communicate a state of charge of the battery. The mechanical locking element may be a padlock shank.

An embodiment of a lockout/tagout system for an industrial system such as an electrical power distribution system has also been disclosed. The system includes a multi-user mechanical locking device having a locking element, a lock actuator, a processor-based control element, and a communication element configured to establish one of near field communication or short-range communication with a number n of processor-based worker devices configured to communicate with the multi-user mechanical locking device. Each processor-based worker device is configured to issue an electronic locking command or an electronic unlocking command to the multi-user mechanical locking device by respective workers responsible to perform a maintenance task in the electrical power system. The processor-based control element of the multi-user mechanical locking device is configured to: wirelessly accept an electronic locking command from each of the number n of processor-based worker devices; in response to the accepted locking commands operate a lock actuator to lock the mechanical locking element; wirelessly accept an electronic unlocking command from each of the same number n of processor-based worker devices; and in response to the accepted unlocking commands operate the lock actuator to unlock the mechanical locking element; wherein the number n is an integer greater than 1 to realize a lockout safety chain of a desired length.

Optionally, the lockout/tagout system of claim 8 may include a display providing lockout data corresponding to the accepted locking commands. The number n of processor-based worker devices may selected from the group of processor-based devices including a smart phone, a tablet device, a laptop computer, or a notebook computer. At least one of the number n of processor-based worker devices may have a cellular communication capability. The lockout/tagout system may be in communication with a SCADA system. The multi-user mechanical locking device may include a battery, and the processor-based control element may be configured to communicate a state of charge of the battery. The mechanical locking element may be a padlock shank.

An embodiment of a lockout/tagout method for an industrial system such as an electrical power distribution system to ensure the safety of respective workers responsible to perform a maintenance task in the electrical power system has also been disclosed. The lockout/tagout method includes establishing a lockout safety chain of a desired length via a processor-based, multi-user mechanical locking device attached to an electrical device that establishes an open circuit in the electrical power system by: wirelessly accepting an electronic locking command at the multi-user mechanical locking device from each of the number n of processor-based worker devices; in response to the accepted locking commands, operating a lock actuator in the multi-user mechanical locking device to a lock position; wirelessly accepting an electronic unlocking command at the multi-user mechanical locking device from each of the same number n of processor-based worker devices; and in response to the accepted unlocking commands operating the lock actuator to an unlocked position; wherein the number n is an integer greater than 1 to realize the lockout safety chain of the desired length.

Optionally, the lockout/tagout method may also include displaying lockout data corresponding to the accepted locking commands. The lockout/tagout method may also include communicating lockout data corresponding to the accepted locking commands to a SCADA system. The processor-based, multi-user mechanical locking device may include a battery, with the method further including communicating a state of charge of the battery to at least one of the processor-based worker devices. The processor-based, multi-user mechanical locking device may include a machine readable element, with the method further including: reading the machine readable element with at least one of the number n of processor-based worker devices; and issuing an electronic locking command or an electronic locking command using data retrieved from the machine readable element. The mechanical locking element may be a padlock shank.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A multi-user lockout/tagout device for a lockout safety chain in an industrial system, the multi-user lockout/tagout device comprising:

a mechanical locking element;

a lock actuator acting upon the mechanical locking element; and a processor-based control element in communication with the lock actuator to selectively control a position of the lock actuator with respect to the mechanical locking element when the mechanical locking element is coupled to a device in the industrial system, wherein the processor-based control element is configured to:

wirelessly accept an electronic locking command from each of a number n of processor-based worker devices of respective workers responsible to perform a maintenance task in the industrial system;

store electronic locking command data as each electronic locking command is accepted, and in response to the accepted locking commands operate the lock actuator to lock the mechanical locking element;

wirelessly accept an electronic unlocking command from each of the same number n of processor-based worker devices of respective workers responsible to perform a maintenance task in the industrial system *only when the unlocking commands are received in a particular order from at least some of the number n of processor-based worker devices*;

store electronic unlocking command data as each electronic unlocking command is accepted, and in response to the accepted unlocking commands operate the lock actuator to unlock the mechanical locking element;

wherein the number n is an integer greater than 1 to realize the lockout safety chain of a desired length; and wherein locking and unlocking of the lock actuator in the lockout safety chain only occurs when all locking and unlocking commands are received from each number n of processor-based worker devices.

2. The multi-user lockout/tagout device of claim 1, further comprising a display providing lockout data corresponding to the accepted locking commands.

3. The multi-user lockout/tagout device of claim 1, further comprising a communication element, the communication element configured to receive an electronic locking command or an electronic unlocking command.

4. The multi-user lockout/tagout device of claim 3, wherein the communication element is configured to conduct near field communication or short range communication with the number n of processor-based worker devices.

5. The multi-user lockout/tagout device of claim 1, further comprising a machine readable element identifying the multi-user lockout/tagout device to each of the number n of processor-based worker devices.

6. The multi-user lockout/tagout device of claim 1, further comprising a battery, and the processor-based control element further configured to communicate a state of charge of the battery.

7. The multi-user lockout/tagout device of claim 1, wherein the mechanical locking element is a padlock shank.

8. A lockout/tagout system for a lockout safety chain in an industrial system comprising:

a multi-user mechanical locking device including a locking element, a lock actuator, a processor-based control element, and a communication element configured to establish one of near field communication or short-range communication with a number n of processor-based worker devices configured to communicate with the multi-user mechanical locking device, each processor-based worker device configured to issue an electronic locking command or an electronic unlocking command to the multi-user mechanical locking device by respective workers responsible to perform a maintenance task in the industrial system;

wherein the processor-based control element of the multi-user mechanical locking device is configured to:

wirelessly accept an electronic locking command from each of the number n of processor-based worker devices;

in response to the accepted locking commands operate a lock actuator to lock the mechanical locking element;

wirelessly accept an electronic unlocking command from each of the same number n of processor-based worker devices *only when the unlocking commands are received in a particular order from at least some of the number n of processor-based worker devices*; and in response to the accepted unlocking commands operate the lock actuator to unlock the mechanical locking element;

wherein the number n is an integer greater than 1 to realize the lockout safety chain of a desired length; and wherein locking and unlocking of the lock actuator in the lockout safety chain only occurs when all locking and unlocking commands are received from each number n of processor-based worker devices.

9. The lockout/tagout system of claim 8, further comprising a display providing lockout data corresponding to the accepted locking commands.

10. The lockout/tagout system of claim 8, wherein the number n of processor-based worker devices is selected from [the] *a* group of processor-based devices including a smart phone, a tablet device, a laptop computer, or a notebook computer.

11. The lockout/tagout system of claim 8, wherein at least one of the number n of processor-based worker devices has a cellular communication capability.

12. The lockout/tagout system of claim 8, further in communication with a SCADA system.

13. The lockout/tagout system of claim 8, wherein the multi-user mechanical locking device further comprises a battery, and wherein the processor-based control element is further configured to communicate a state of charge of the battery.

14. The lockout/tagout system of claim 8, wherein the mechanical locking element is a padlock shank.

15. A lockout/tagout method for a lockout safety chain in an industrial system to ensure the safety of respective workers responsible to perform a maintenance task in the industrial system, lockout/tagout method comprising[;]*:* establishing the lockout safety chain of a desired length via a processor-based, multi-user mechanical locking device attached to a device establishing a safe working position in the industrial system by:

wirelessly accepting an electronic locking command at the multi-user mechanical locking device from each of [the] *a* number n of processor-based worker devices;

in response to the accepted locking commands, operating a lock actuator *acting upon a mechanical locking element* in the multi-user mechanical locking device to a lock position;

wirelessly accepting an electronic unlocking command at the multi-user mechanical locking device from each of the same number n of processor-based worker devices *only when the unlocking commands are received in a particular order from at least some of the number n of processor-based worker devices*; and in response to the accepted unlocking commands operating the lock actuator to an unlocked position;

wherein the number n is an integer greater than 1 to realize the lockout safety chain of the desired length; and wherein locking and unlocking of the lock actuator in the lockout safety chain only occurs when all locking and unlocking commands are received from each number n of processor-based worker devices.

16. The lockout/tagout method of claim 15, further comprising displaying lockout data corresponding to the accepted locking commands.

17. The lockout/tagout method of claim 15, further comprising communicating lockout data corresponding to the accepted locking commands to a SCADA system.

18. The lockout/tagout method of claim 15, wherein the processor-based, multi-user mechanical locking device includes a battery, the method further comprising communicating a state of charge of the battery to at least one of the processor-based worker devices.

19. The lockout/tagout method of claim 15, wherein the processor-based, multi-user mechanical locking device includes a machine readable element, the method further including:

reading the machine readable element with at least one of the number n of processor-based worker devices; and issuing an electronic locking command or an electronic locking command using data retrieved from the machine readable element.

20. The lockout/tagout method of claim 15, wherein the mechanical locking element is a padlock shank.

*21. The multi-user lockout/tagout device of claim 1, wherein two or more registered processor-based worker devices are configured for peer-to-peer communication, whereby at least a first one of the two or more registered processor-based worker devices may issue an unlocking command at a location remote from the lockout/tagout device to a second one of the two or more registered processor-based worker devices at the location of the lockout/tagout device.*

* * * * *